United States Patent [19]

Niihara

[11] Patent Number: 5,157,742
[45] Date of Patent: Oct. 20, 1992

[54] MOTION IMAGE DATA COMPRESSION SYSTEM

[75] Inventor: Takami Niihara, Yokosuka, Japan

[73] Assignee: Victor Company of Japan, Ltd., Yokohama, Japan

[21] Appl. No.: 661,861

[22] Filed: Feb. 27, 1991

[30] Foreign Application Priority Data

Feb. 28, 1990 [JP] Japan .................................. 2-50270

[51] Int. Cl.$^5$ ............................................. G06K 9/36
[52] U.S. Cl. ..................................... 382/56; 358/105; 358/136; 382/41
[58] Field of Search ...................... 382/56, 48, 41, 44; 358/105, 138, 133, 140

[56] References Cited

U.S. PATENT DOCUMENTS

| | | | |
|---|---|---|---|
| 4,636,862 | 1/1987 | Hatori et al. | 358/105 |
| 4,661,849 | 4/1987 | Hinman | 358/105 |
| 4,727,422 | 2/1988 | Hinman | 358/105 |
| 4,802,005 | 1/1987 | Kondo | 358/105 |
| 4,805,017 | 2/1989 | Kaneko et al. | 358/136 |
| 4,864,393 | 9/1989 | Harradine et al. | 358/105 |
| 5,005,078 | 4/1991 | Gillard | 358/105 |
| 5,010,401 | 4/1991 | Murakami et al. | 358/136 |

Primary Examiner—Joseph Mancuso
Attorney, Agent, or Firm—Michael N. Meller

[57] ABSTRACT

A motion data image compression system comprises a first element to divide an I'th frame (I=1, 2, ... N−1) between the two frames $F_O$ and $F_N$ out of N frames (where N is an integer of 2 or more) of digital motion image data, into a block $B_I$ formed of a plural number of pixels, and to determine the motion vector MVOI of frames $F_O$ and $F_I$ for each of the divided blocks $B_I$ and to determine the block $B_O$ that uses the motion vector MVOI to predict the block $B_I$, a second element to determine the motion vector MVNI between frame $F_N$ and $F_I$ for each block $B_I$ and that uses the motion vector MVNI to determine the block $B_N$ that predicts the block $B_I$, a third element that determines the motion vectors MVON and MVNO of frame $F_N$ and $F_O$ for each block $B_I$, and uses the motion vectors MVON and MVNO to determine the predictive motion vector MVOI' between frame $F_O$ and $F_I$, determine the block $B_O$, that predicts the block $B_I$, determine the predictive motion vector MVNI' between frames $F_N$ and $F_I$, and that uses the predictive motion vector MVNI' to determine the block $B_N$, that predicts block $B_I$ and the block $B_{ON}$, that is the linear sum of blocks $B_O$, and $B_{N'}$, a fourth element that determines the block $B_{DC}$ from the average value of block $B_I$, and a fifth element that selects the block out of the blocks $B_O$, $B_N$, $B_{ON}$, and $B_{DC}$ for which the correlation with block $B_I$ is greatest.

11 Claims, 6 Drawing Sheets

MOTION IMAGE DATA COMPRESSION SYSTEM

BACKGROUND OF THE INVENTION

The present invention relates to a favorable motion image compression system used when motion image data are compressed and transmitted.

Figure 1:
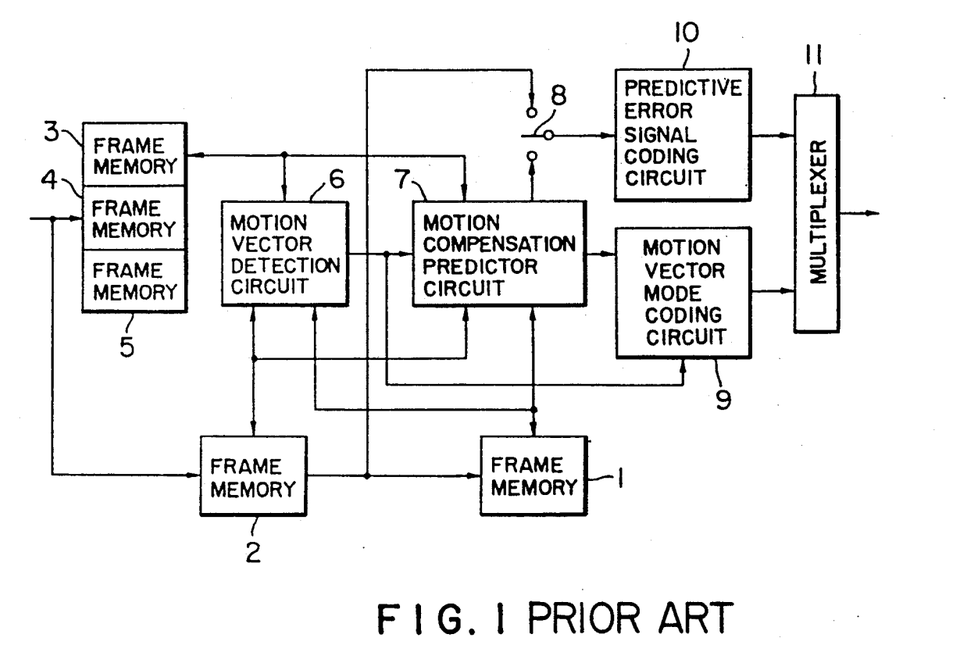
FIG. 1 is a block diagram showing a configuration of a motion image data compression system of a conventional technique and the present invention.

FIG. 1 is a block diagram showing the configuration of a conventional motion image data compression system that processes motion images as units of N frames (where, in this example, N=4).

Figure 2:
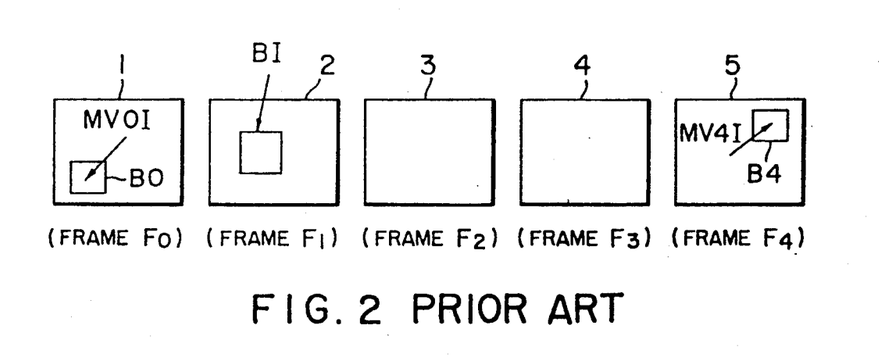
FIG. 2 is a view describing the operation of the system in FIG. 1.

Five frames of digitally connected image data from the 0th frame ($F_0$) to the 4th frame ($F_4$) from a circuit (not indicated in the figure) are respectively stored in frame memories 1 through 5 (refer to FIG. 2). A motion vector detection circuit 6 divides the data of frame I (I=1, 2, 3) into blocks $B_I$ for each $8 \times 8$ pixels for example, and each block $B_I$ units has the motion vector MV0I between frame $F_0$ and frame $F_I$ and the motion vector MV4I between frame $F_4$ and frame $F_I$ calculated and output to a motion compensation predictor circuit 7.

The motion compensation predictor circuit 7 uses the motion vectors MV0I and MV4I as the reference for performing motion compensation predictive for the block $B_I$ for a required mode, and the prediction error signals are output to a predictive error signal coding circuit 10 via a switch 8. In addition, the motion compensation predictor circuit 7 outputs data relating to the motion vector and the predictive mode to the predictive error signal coding circuit 10. The predictive error signal coding circuit 10 codes the data that is read from the input frame $F_2$ via the switch 8, and codes the predictive error signals output from the predictive compensation predictor circuit 7. In addition, the/a motion vector mode coding circuit 9 codes the motion vector and the predictive mode. A microprocessor 11 overlaps the output of the predictive error signal coding circuit 10 and the motion vector mode coding circuit 9, and outputs it to a demodulation system via a transmission system not indicated in the figure.

Figure 3:
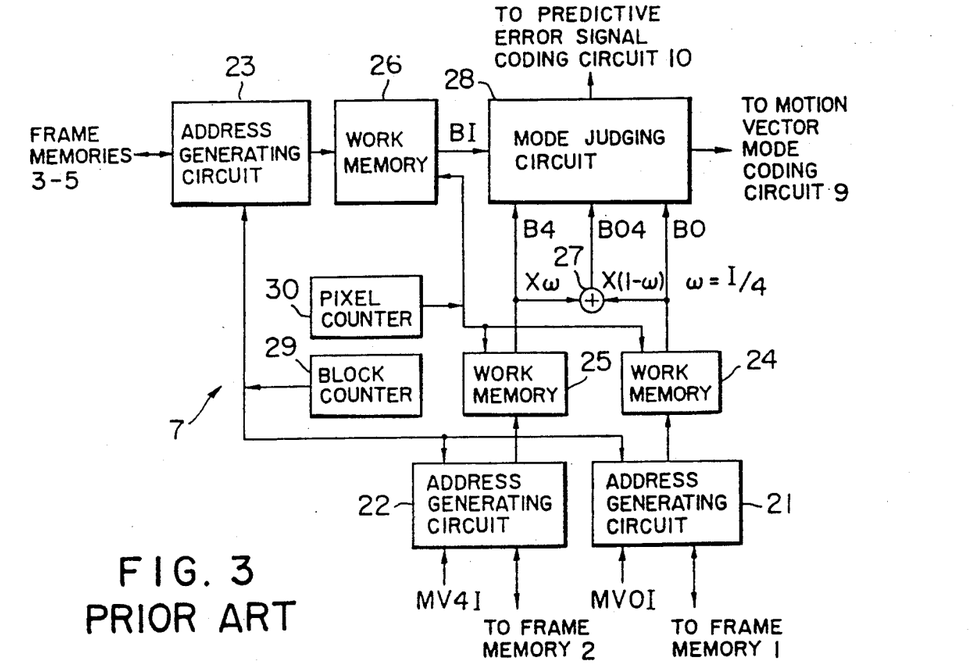
FIG. 3 is a block diagram showing a configuration of a motion compensation predictor circuit in the system of FIG. 1.

The motion compensation predictor circuit 7 is configured as indicated in FIG. 3 for example.

An address generating circuit 21 generates an address of block $B_0$ from an address of block $B_I$ input by an address generating circuit 23 and the motion vector MV0I for between frames $F_0$ and $F_I$, reads the data of that address from frame memory 1, and stores it in a work memory 24. In the same manner, an address generating circuit 22 generates an address of block $B_4$ from the address of the block $B_I$ input from the address generating circuit 23 and the motion vector MV4I for between frames $F_4$ and $F_I$, reads that address from the frame memory 2 and stores it in the work memory 25.

During this time, the number of blocks is counted by a block counter 29.

The data of block $B_0$ that is written to the work memory 24 is input to the mode judgment circuit 28 and also supplied to an adder 27. In the same manner, the data of block $B_4$ that is written to a mode judgment circuit 28 is input to the mode judgment circuit 28 and also supplied to the adder 27. The adder 27 multiplies the data of block $B_0$ input from the work memory 24, by a coefficient $(1-\omega)$ (where $\omega=1/4$), and the data for block $B_4$ input from a work memory 25 is multiplied by the coefficient $\omega$ and the two are added.

More specifically, the adder 27 outputs the block $B_{04}$ by linear interpolation of blocks $B_0$ and $B_4$, as shown by the following equation.

$$B_{04} = B_0 \times w + B_4 \times (1-W)$$

The data of this block $B_{04}$ is also output to the mode judging circuit 28.

During this time, the number of pixels is counted by a pixel counter 30.

In addition, the address generating circuit 23 reads the address of block $B_I$ from one of the frame memories 3 through 5 and outputs it to a work memory 26. The data of block $B_I$ that is stored in the work memory 26 is supplied to the mode judging circuit 28.

Figure 4:
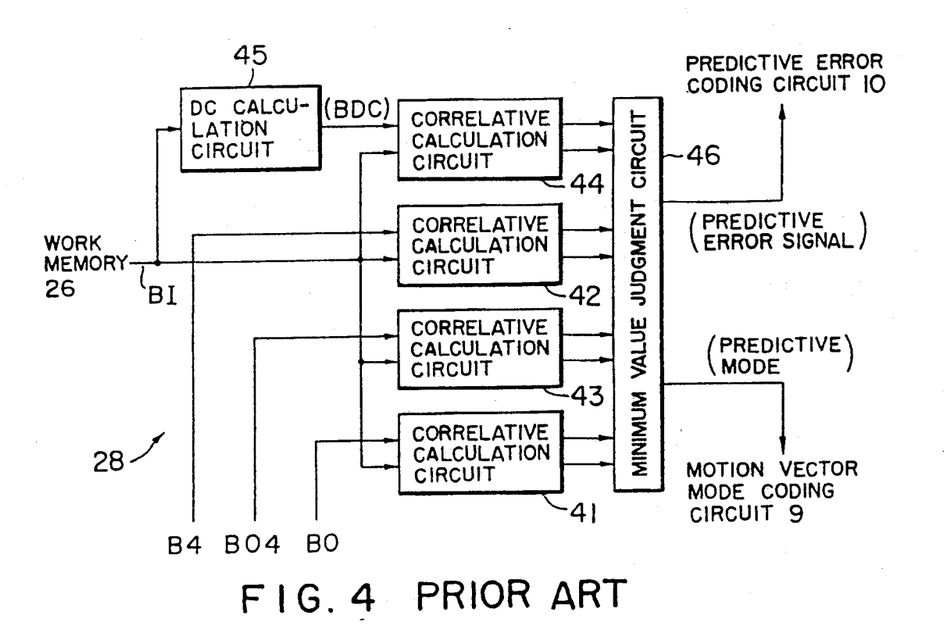
FIG. 4 is a block diagram showing the configuration of a mode judgment circuit in the system of FIG. 1.

The mode judging circuit 28 is configured as shown in FIG. 4, for example.

The data of the block $B_I$ that is stored in the work memory 26 is supplied to correlation calculation circuits 41 through 44, and to the direct current (DC) component calculation circuit 45. The DC component calculation circuit 45 averages the data of block $B_I$, generates a block $B_{DC}$ and outputs it to the correlation calculation circuit 44. The data of blocks $B_0$, $B_4$ and $B_{04}$ are input to correlation calculation circuits 41 through 43.

The correlation calculation circuit 41 calculates the correlation between blocks $B_0$ and $B_I$ and the mean square error (MSE0) between the two and outputs them. In the same manner, the correlation calculation circuit 42 calculates the correlation between blocks $B_4$ and $B_I$ and the mean square error (MSE4) between the two and outputs them, the correlation calculation circuit 43 calculates the correlation between blocks $B_{04}$ and $B_I$ and the mean square error (MSE04) between the two and outputs them, and the correlation calculation circuit 44 calculates the correlation between blocks $B_{DC}$ and $B_I$ and the mean square error (MSEDC) between the two and outputs them. Then, the respective coefficient values SEL0, SEL4, SEL04 and SELDC are determined as follows.

SEL0=MSE0
SEL4=MSE4
SEL04=MSE04
SELDC=MSEDC$\times \alpha + \beta$

Where $\alpha$ and $\beta$ are coefficients the satisfy the following conditions.

$0 < \alpha < 1$
$0 < \beta$

These correlation values becomes smaller when the correlation with block $B_I$ becomes higher.

A minimum value judgment circuit 46 judges the smallest value from the four correlation values, and makes the corresponding mode the predication mode. Then, that predictive mode and the motion vector in that predictive mode is output to the motion vector coding circuit 9 and a predictive error signal corresponding to the difference between the block $B_I$ and a constant value and the blocks $B_0$, $B_4$, $B_{04}$ predicted in the predictive mode is generated and output to the predictive error signal coding circuit 10.

More specifically, each of the modes can be described in the following manner.

Mode 1: Block $B_0$ is the predictive block and the motion vector MV0I is coded.

Mode 2: Block $B_4$ is the predictive block and the motion vector MV4I is coded.

Mode 3: Block $B_{04}$ is the predictive block and the motion vectors MV0I and MV4I are coded.

Mode 4: Block $B_{DC}$ is the predictive block and the motion vector is not coded.

In this manner, in the conventional apparatus, when mode 3 is selected, coding is performed for the two motion vectors MV0I and MV4I and there is the problem that the amount of coding becomes large.

In addition, when there is movement of one pixel in four frames, there is a minute movement of one pixel or less between frames. However, it is not possible to predict movement of one pixel or less and so since there is no method for the expression of movement in units of one pixel, the error between the predicted pixel and the actual pixel becomes large. Accordingly, the amount of coding of the predictive error block corresponding to the predictive error signal becomes large.

SUMMARY OF THE INVENTION

In order to solve the problem described above, an object of the present invention is to provide a motion image data compression system that can perform accurate and efficient motion compensation with respect to minute movement by reducing the amount of coding and without producing image deterioration by the generation of a predictive block using the predicted motion vector.

The motion data image compression apparatus relating to the present invention comprises a first means to divide an I'th frame (I=1, 2, ... N−1) between the two frames $F_0$ and $F_N$ out of N frames (where N is an integer of 2 or more) of digital motion images, into a block $B_I$ formed of a plural number of pixels, determine the motion vector MV0I of frame $F_0$ and $F_I$ for each of the divided blocks $B_I$ and determine the block $B_0$ that uses the motion vector MV0I to predict the block $B_I$, a second means to determine the motion vector MVNI between frame $F_N$ and $F_I$ for each block $B_I$ and uses the motion vector MVNI to determine the block $B_N$ that predicts the block $B_I$, a third means that determines the motion vectors MV0N and MVN0 of frame $F_N$ and $F_0$ for each block $B_I$, and uses the motion vectors MV0N and MVN0 to determine the predictive motion vector MV0I' between frame $F_0$ and $F_I$, determine the block $B_{0'}$ that predicts the block $B_I$, determine the predictive motion vector MVNI' between frames $F_N$ and $F_I$, and uses the predictive motion vector MVNI' to determine the block $B_{N'}$ that predicts block $B_I$ and the block $B_{0N'}$ that is the linear sum of blocks $B_{0'}$ and $B_{N'}$, a fourth means that determines the block $B_{DC}$ from the average value of block $B_I$, a fifth means that selects the block for which the correlation with block $B_I$ is greatest, and a sixth means that determines the block $B_{0N}$ formed by the linear sum of block $B_0$ and $B_N$, with the fifth means selecting the block out of block $B_0$, $B_N$, $B_{0N}$, $B_{0N'}$ and $B_{DC}$ for which the correlation with block $B_I$ is greatest.

In a motion data image compression system according to another aspect, the motion vectors MV0N and MVN0 of frame $F_N$ and $F_0$ are determined for each block $B_I$ and these motion vectors MV0N and MVN0 are used to determine the predictive motion vector MV0I' between frame $F_0$ and $F_I$. In addition, the predictive motion vector MV0I' is used to determine the block $B_I$ as the predictive block $B_{0'}$. Furthermore, the predictive motion vector MVNI' between frame $F_N$ and $F_I$ is determined and the predictive motion vector MVNI is used to determine the block $B_I$ as the predictive block $B_{N'}$. Then, the block $B_{0N'}$ comprising the linear sum of blocks $B_{0'}$ and $B_{N'}$ is determined.

- It is therefore possible to predict movements of one pixel or less, and therefore reduce the amount of coding.

According to the motion image data compression system according to the main aspect and as has been described above, it is possible to use the predictive motion vector to generate a predictive block and therefore reduce the number of motion vectors for coding and therefore reduce the amount of coding. In addition, it is possible to raise the motion vector resolution performance and therefore enable the accurate and efficient performance of motion compensation even with respect to minute movements.

In addition, according to the motion image data compression system according to the other aspect and as has been described above, the block $B_{0N}$ is determined from the linear sum of block $B_0$ and $B_N$ and the block out of blocks $B_0$, $B_N$, $B_{0N'}$ and $B_{DC}$ that has the least correlation with block $B_I$ is selected.

Accordingly, it is possible to prevent deterioration of the image quality.

In addition, according to the motion image data compression system according to the other aspect and as has been described above, the block $B_{0N}$ is further determined from the linear sum of the block $B_0$ and $B_N$ and so there is no deterioration of the image quality, and the amount of coding can be further reduced.

DETAILED DESCRIPTION OF THE PREFERRED EMBODIMENTS

The following is a description of the preferred embodiments of the motion image data compression system according to the present invention.

The basic configuration of the motion image data compression system according to a first embodiment of the present invention is the same as that indicated for the conventional technology in FIG. 1. However, in the motion image data compression system of the first embodiment, the motion compensation predictor circuit 7 of FIG. 1 has the configuration as shown in FIG. 5, for example.

The configuration of the address generating circuit 21 through to the pixel counter 30 is practically the same as that shown in FIG. 3 and so the description thereof is omitted.

Figure 5:
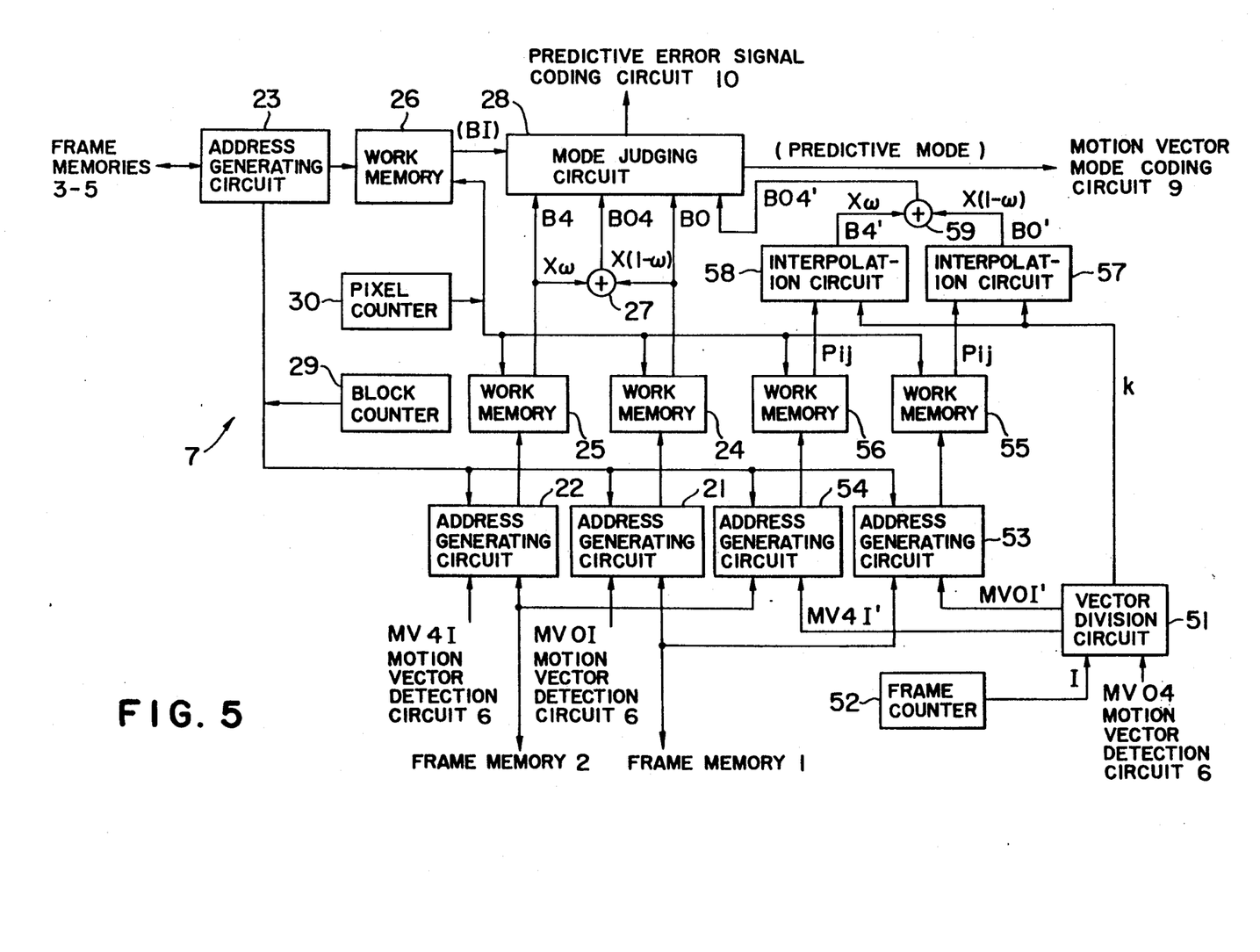
FIG. 5 is a block diagram showing the configuration of a motion compensation predictor circuit in the motion image data compression system according to a first embodiment of the present invention.

In the first embodiment shown in FIG. 5, the motion vector MV04 from the motion vector detection circuit 6 and the number of frames I from a frame counter 52 are respectively input to a vector division circuit 51. The vector division circuit 51 generates predictive motion vectors MV0I' and MV4I' and respectively inputs them to address generating circuits 53 and 54.

The address generation circuits 53 and 54 read the data of the addresses corresponding to the predictive motion vectors MV0I' and MV4I' and respectively store them in work memories 55 and 56. The data of the work memories 55 and 56 are respectively supplied to interpolation circuits 57 and 58 where the vector division circuit 51 multiplies them by a coefficient corresponding to the output signal k, and outputs the result to an adder 59. The output of the adder 59 is output to the mode judging circuit 28.

Figure 6:
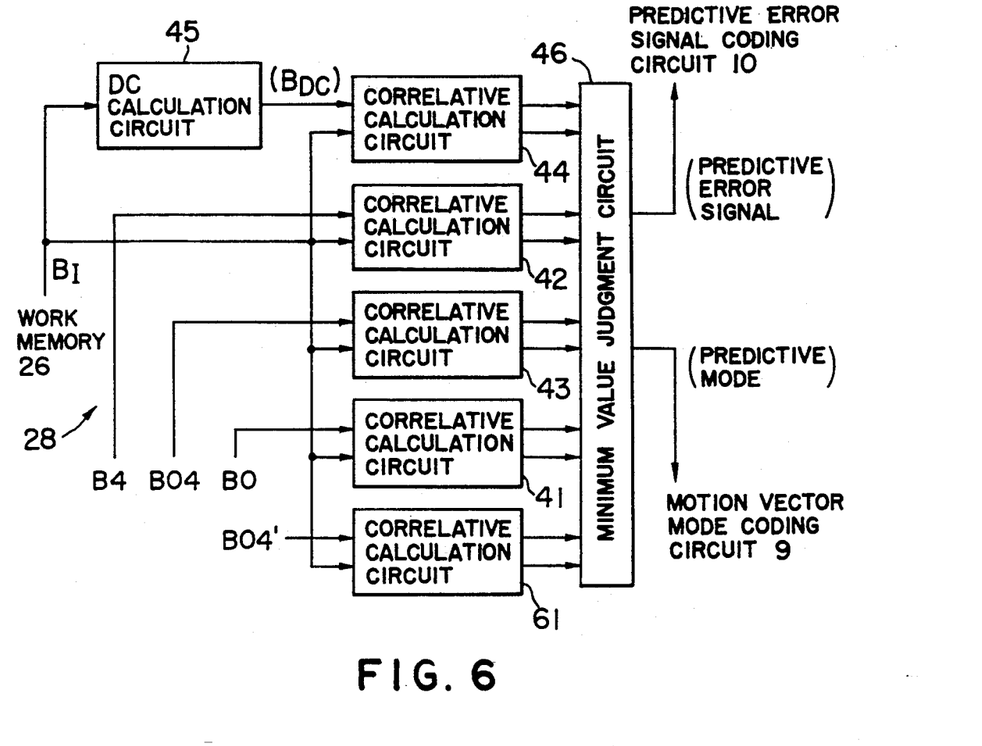
FIG. 6 is a block diagram showing the configuration of a mode judgment circuit in the motion image data compression system according to a first embodiment of the present invention.

The mode judging circuit 28 is configured as shown in FIG. 6. More specifically, to the configuration shown in FIG. 4, there is added a correlation calculation circuit 61 and the block $B_{04'}$ and block $B_I$ are input to the correlation calculation circuit 61. Then, the minimum value judgment circuit 46 is configured so as to judge the minimum value of the output of the correlation calculation circuit 61 and the correlation calculation circuit 41 through 44. The other portions of the configuration are the same as those in the configuration shown in FIG. 4.

In this first embodiment of the present invention and having the configuration as described above, the first means is configured from the address generating circuit 21 and the work memory 24, the second means is configured from the address generation circuits 2 and the work memory 25, the third means is configured from the address generation circuits 53 and 54, the work memories 55 and 56, the interpolation circuits 57 and 58 and the adder 59, the fourth means is configured from the DC calculation circuit 45, the fifth means is configured from the minimum value judging circuit 46 and the sixth means is generated from the adder 27.

The following is a description of the operation.

The operation up to the input of the blocks $B_0$, $B_4$, $B_{04}$ and $B_I$ to the mode judging circuit 28 is the same as has been described above and so the description will be omitted.

In addition to the motion vectors MV0I and MV4I, the motion vector detection circuit 6 generates the motion vector MV04 between frames 0 and 4, and outputs this motion vector MV04 to the vector division circuit 51. In addition, the number of frames I counted by the frame counter 52 is input to the vector division circuit 51. The vector division circuit 51 uses this input to perform the following calculations, and generates the predictive motion vectors MV0I' and MV4I'.

$$MV0I' = MV04 \times I/4$$

$$MV4I' = -MV04 \times (4-I)/4$$

Accordingly, for example, when
I = 3 and
MV04 = (5, 7)
the predictive motion vectors MV03' and MV3I' become
MV03' = (3.75, 5.25)
MV43'(−1.25, −1.75)

More specifically, these predictive motion vectors have a resolution of ¼ of a pixel.

Figure 7:
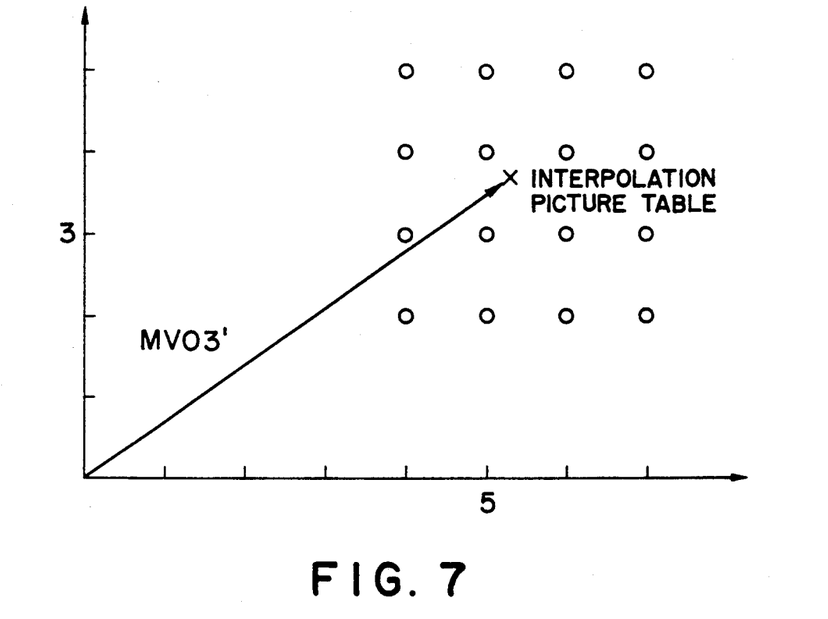
FIGS. 7 and 8 are graphs showing the interpolation operation of the systems of the embodiments shown respectively in FIGS. 5 and 6.

As shown in FIG. 7, the address generating circuit 53 reads for example, the 16 pixel data $P_{ij}$ (i=0, 1, 2, 3; j=0, 1, 2, 3) of the periphery of the interpolation position (shown by x in the figure) indicated by the predictive motion vector MV0I' (MV03' in the case of this example) and writes to the work memory 55. At the same time, the address generating circuit 54 reads for the 16 pixel data $P_{ij}$ of the periphery of the interpolation position indicated by the predictive motion vector MV4I' and writes to the work memory 56.

Figure 8:
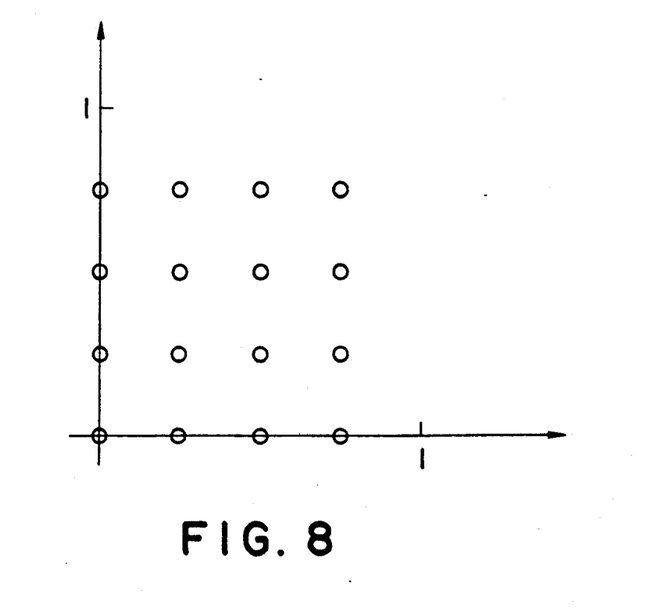

On the other hand, as shown in FIG. 8, when the predictive motion vector has a resolution of ¼ of a pixel, there are 16 interpolation positions. The vector division circuit 51 outputs the signals k (k=0, 1, 2, ... 15) corresponding to these interpolation positions, to the interpolation circuits 57 and 58. The interpolation circuits 57 and 58 store coefficients $F_{kij}$ corresponding to the signals k and perform the following calculations with the 16 pixel data $P_{ij}$ described above.

$$P = \Sigma\Sigma P_{ij} \times F_{kij}$$

The interpolation circuit 57 uses this value P to generate the predictive block $B_{0'}$. In the same manner, the interpolation circuit 58 uses this value P to generate the predictive block $B_{4'}$.

The adder 59 multiplies the data of the block $B_{0'}$ inserted from the interpolation circuit 57 by the coefficient (1 −ω), and multiplies the data of the block $B_{4'}$ input from the interpolation circuit 58 by the coefficient ω, and adds the two together.

More specifically, the adder 59 outputs the block $B_{04'}$ by the linear interpolation of blocks $B_{0'}$ and $B_{4'}$ in the same manner as the adder 27 and as shown by the following equation.

$$B_{04'} = \{B_{0'} \times (4-I) + B_{4'} \times I\}/4$$

This predictive block $B_{04'}$ is input to the correlation calculation circuit 61 of the mode judgment circuit 28. The correlation calculation circuit 61 calculates the mean square error (MSE04') between the block $B_I$ and the predictive block $B_{04'}$ and also calculates the correlation value SEL04' using the following equation.

$$SEL04' = MSE04' - \gamma$$

Here, γ is a coefficient that satisfies the following condition.

$$0 < \gamma$$

Accordingly, the minimum value judgment circuit 46 judges the minimum value of the five correlation values SEL0, SEL4, SEL04, SELDC and SEL04'. Then, when the correlation value SEL04' has been selected as the minimum value, the difference between the predictive block $B_{04'}$ and the block $B_I$ is output to the predictive error signal coding circuit 10 as the signal of the predictive error block. In addition, the motion vector MV04 used in frames 1, 2 and 3 is output to the motion vector mode coding circuit 9.

Then, when the predictive mode is mode 5 at this time, the data for this mode 5 is also output to the motion vector mode coding circuit 9.

In this manner, in the case of this first embodiment, the modes 1 through 4 described above also have mode 5 added to them.

In mode 5, there is one motion vector and so the amount of coding is less than for mode 3.

In addition, when mode 4 is not selected, and when the predictive motion vector MV0I' is in the vicinity of the motion vector MV0I and the predictive motion vector MV4I' exists in the vicinity of the motion vector MV4I, the value of the coefficient $\gamma$ is set to a value that is large to a certain extent and the selection of mode 5 is made easier. Accordingly, it is possible for the mean amount of coding to be reduced.

In addition, in the case of the first embodiment shown in FIG. 5, at least one portion of the multiplexed data is written to the work memories 55 and 56 as well as the work memories 24 and 25 and so the time that it takes to access the frame memories 1 and 2 is twice that conventionally required.

Figure 9:
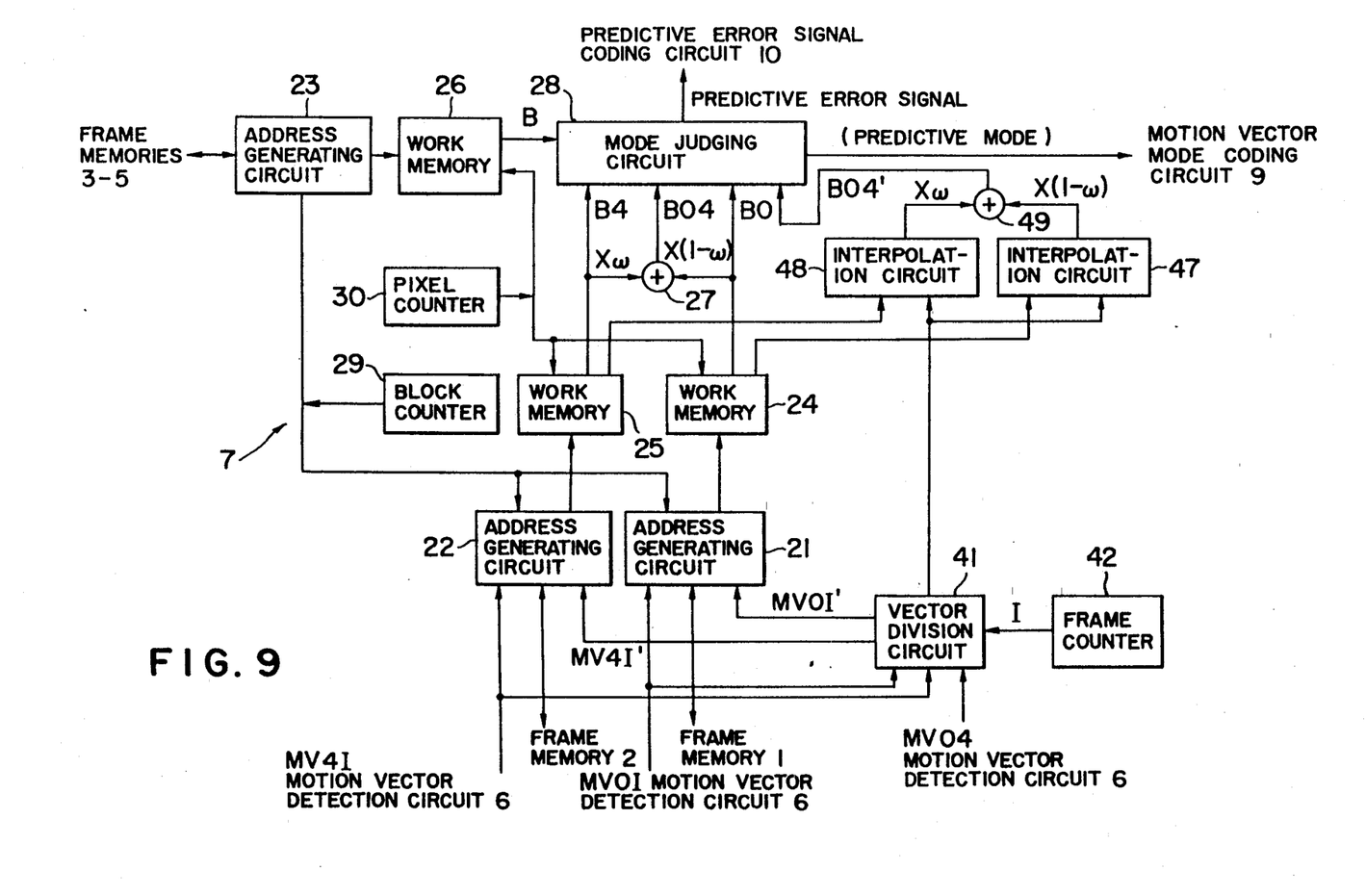
FIG. 9 is a block diagram showing the configuration of a motion compensation predictor circuit in the motion image data compression system according to a second embodiment of the present invention.

However, it is possible to have the configuration of the second embodiment as shown in FIG. 9.

In the case of the second embodiment, the address generating circuits 53 and 54 and the work memories 55 and 56 of the first embodiment shown in FIG. 5 are omitted and the predictive motion vectors MV0I' and MV4I' output from the vector division circuit 51 are respectively supplied to the address generating circuits 21 and 22, and the corresponding data are written to the work memories 24 and 25.

The other portions of this configuration are the same as for the case of the first embodiment shown in FIG. 5.

In FIG. 9, a vector division circuit 41 judges whether or not the predictive motion vector MV0I' exists in the vicinity of the motion vector MV0I and whether the predictive motion vector MV4I' exists in the vicinity of the motion vector MV4I. Numeral 42 shows a frame counter.

When the predictive motion vector MV0I' does not exist in the vicinity of the motion vector MV0I and when the predictive motion vector MV4I' does not exist in the vicinity of the motion vector MV4I, the vector division circuit 41 stops the operation for the generation of the predictive block B04' by interpolation circuits 47 and 48, and an adder 59. As a result, the selection of modes 1 through 4 is performed in the same manner as in the case of the conventional configuration.

Figure 10:
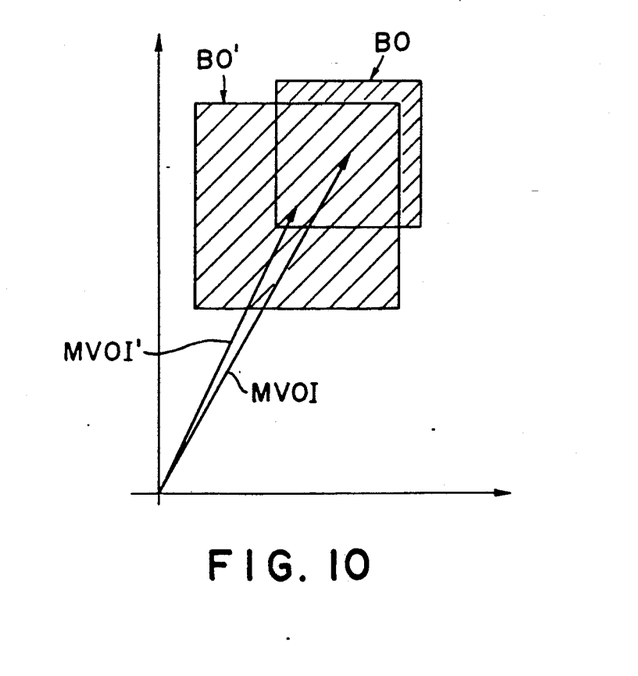
FIG. 10 is a graph describing the operation of a motion compensation predictor circuit of the system of the second embodiment.

On the other hand, when the predictive motion vector MV0I' exists in the vicinity of the motion vector MV0I and when the predictive motion vector MV4I' exists in the vicinity of the motion vector MV4I, then as shown in FIG. 10, pixels of a range that includes both the block B0 and the predictive block B0' are read from the frame memory 1 and written to the work memory 24. In the same manner, pixels of a range that includes both the block B4 and the predictive block B4' are read from the frame memory 2 and written to the work memory 25. By this, it is possible to reduce the access time with respect to frame memories 1 and 2.

Moreover, although it is not indicated in the figure, the coding system codes the mode and the codes modes are used to perform coding of the motion vectors MV0I, MV4I and MV04. In addition, the motion vector is used in the same manner as the coding system for each mode and the calculations are performed in the same manner to determine the predictive block. Furthermore, the sum of the coded predictive error block and the coded block is used to determine the coded block for each block unit.

Moreover, in the above description, the predictive vector is used to calculate the data of the interpolation position but instead of performing these calculations, it is also possible to use data of pixels in the position closest to the interpolation position as it is. If this is done, then it is not possible to increase the resolution but the complex calculations are no longer necessary and so the configuration can be simplified.

Also, it is possible to not use the mode 3 described above and for only modes 1, 2, 4 and 5 to be used. If this is done, then the image quality will deteriorate when compared to the case when mode 3 is used but there will be no cases when two motion vectors are coded and so the amount of coding can be reduced when compared to the case when mode 3 is used.

What is claimed is:

1. A motion image data compression apparatus comprising:
   a first means to divide an I'th frame (I=1, 2, ..., N−1) between the two frames $F_0$ and $F_N$ out of N frames (where N is an integer of 2 or more) of digital motion images, into a block $B_I$ formed of a plural number of pixels, determine the motion vector MV0I of frames $F_0$ and $F_I$ for each of the divided blocks $B_I$ and determine the block $B_0$ that uses the motion vector MV0I to predict the block $B_I$,
   a second means to determine the motion vector MVNI between frames $F_N$ and $F_I$ for each block $B_I$ and use the motion vector MVNI to determine the block $B_N$ that predicts the block $B_I$,
   a third means that determines the motion vector MV0N and MVN0 of frames $F_N$ and $F_0$ for each block $B_I$, and uses the motion vectors MV0N and MVN0 to determine the predictive motion vector MV0I' between frames $F_0$ and $F_I$, determine the block $B_0$, that predicts the block $B_I$, determine the predictive motion vector MVNI' between frames $F_N$ and $F_I$, and uses the predictive motion vector MVNI' to determine the block $B_N$, that predicts block $B_I$ and the block $B_{0N}$, that is the linear sum of blocks $B_0$ and $B_N$,
   a fourth means that determines the block $B_{DC}$ from the average value of block $B_I$, and
   a fifth means that selects the block for which the correlation with block $B_I$ is greatest, from said blocks $B_0$, $B_N$, $B_{0N}$ and $B_{DC}$.

2. The motion image data compression apparatus of claim 1, further comprising:
   a sixth means that determines the block $B_{0N}$ formed by the linear sum of block $B_0$ and $B_N$, with the fifth means selecting the block out of block $B_0$, $B_N$, $B_{0N}$, $B_{0N}$ and $B_{DC}$ for which the correlation with block $B_I$ is greatest.

3. The motion image data compression apparatus of claim 1, wherein:
   said fourth and fifth means and means configure a mode judgment circuit.

4. The motion image data compression apparatus of claim 3, wherein:
   said first means comprises a first address circuit to determine said block $B_0$ as first address data on the basis of the output of a first frame memory and a motion vector detection circuit, and a first work memory that stores first address data output from this circuit, said second means comprising a second address circuit to determine said block $B_N$ as second address data on the basis of the output of a second frame memory and said motion vector detection circuit, and a second work memory that stores second address data output from this circuit, said third means comprising third and fourth address generation circuits, third and fourth work memories to store third and fourth address data output from these circuits, first and second interpolation circuits that perform linear interpolation calculation of output from these third and fourth work memories, and a first adder that adds outputs of said first and second interpolation circuits, said fourth means comprising a direct current (DC) component calculation circuit provided to said mode judgment circuit and performing the DC component calculations on the basis of a fifth address data output from a fifth address generation circuit, and said fifth means comprising a minimum value judgment circuit that judges a minimum value on the basis of an output of said DC calculation circuit and address data output from said first through fourth work memories provided to said mode judgment circuit.

5. The motion image data compression apparatus of claim 4, wherein:

said mode judgment circuit is provided with a first correlation calculation circuit to calculate a correlation of an output calculated by said DC calculation circuit, and second through fifth correlation circuits that calculate correlations of first through fourth data output from said first through fourth work memories.

6. The motion image data compression apparatus of claim 4, further comprising:

a sixth means to determine a block $B_{0N}$ formed by the linear sum of said blocks $B_0$ and $B_N$, said fifth means selecting the block out of said block $B_0$, $B_N$, $B_{0N}$ and $B_{DC}$ for which the correlation with block $B_I$ is greatest.

7. The motion image data compression apparatus of claim 6, wherein:

said sixth means comprises a second adder that determines said block $B_{0N}$ by adding said first and second address data output to said mode judgment circuit from said first and second work memories.

8. The motion image data compression apparatus of claim 4, wherein:

predictive motion vector signals are supplied to a third and fourth address generation circuit configuring said third and fourth means, and further provided with a vector division circuit that supplies an interpolation coefficient to said first and second interpolation circuits.

9. The motion image data compression apparatus of claim 8, further comprising:

a frame counter that supplies a number of frames of said motion image data to said vector division circuit, said vector division circuit being supplied with said number of frames and said motion vector detection circuit being supplied with a detected motion vector.

10. The motion image data compression apparatus of claim 1, wherein:

said first means comprises a first address circuit to determine said block $B_0$ as first address data on the basis of the output of a first frame memory and a motion vector detection circuit, and a first work memory that stores first address data output from this circuit, said second means comprising a second address circuit to determine said block $B_N$ as second address data on the basis of the output of a second frame memory and said motion vector detection circuit, and a second work memory that stores second address data output from this circuit, said third means comprises a frame counter that counts a number of frames of said motion image signals, a vector division circuit that divides a predictive motion vector on the basis of the value counted by this counter and a motion vector (MV4I, MV0I and MV04) detected by said motion vector detection circuit, an interpolation circuit that performs interpolation calculation on the basis of an output of this division circuit and either of the outputs of said first and second work memories, and a first adder that adds outputs of said first and second interpolation circuits, said fourth means comprising a direct current (DC) component calculation circuit provided to said mode judgment circuit and performing DC component calculations on the basis of a fifth address data output from a fifth address generation circuit, and said fifth means comprising a minimum value judgment circuit that judges a minimum value on the basis of an output of said DC calculation circuit and address data output from said first, second and fifth work memories provided to said mode judgment circuit.

11. The motion image data compression apparatus of claim 10, further comprising:

a sixth means that determines the block $B_{0N}$ formed by the linear sum of block $B_0$ and $B_N$, with the fifth means selecting the block out of block $B_0$, $B_N$, $B_{0N}$, $B_{0N'}$ and $B_{DC}$ for which the correlation with block $B_I$ is greatest.

* * * * *